W. FAVREAU.
FASTENING DEVICE.
APPLICATION FILED JAN. 14, 1907.
920,044.
Patented Apr. 27, 1909.
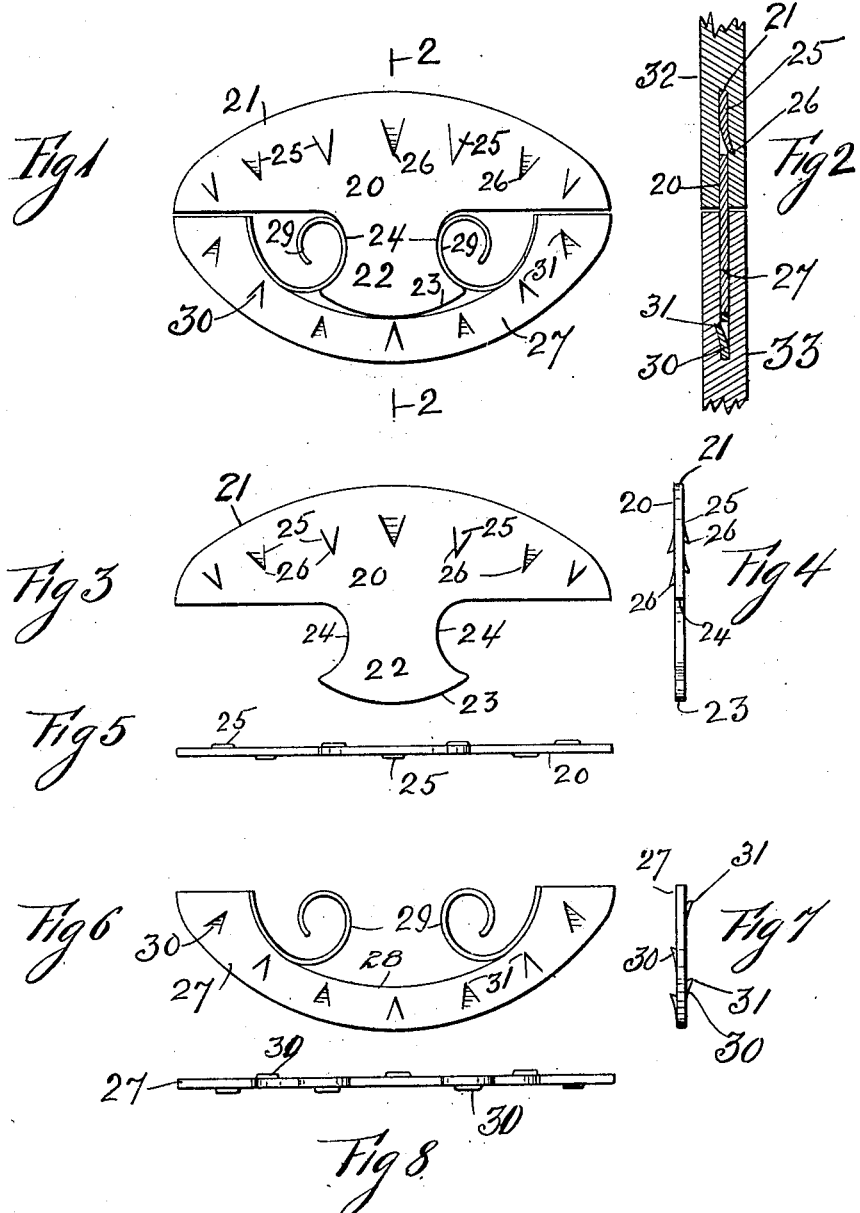

UNITED STATES PATENT OFFICE.

WALTER FAVREAU, OF NEW YORK, N. Y.

FASTENING DEVICE.

No. 920,044.     Specification of Letters Patent.     Patented April 27, 1909.

Application filed January 14, 1907. Serial No. 352,131.

*To all whom it may concern:*

Be it known that I, WALTER FAVREAU, a subject of the Emperor of Germany, and resident of the borough of Manhattan, in the county of New York and State of New York, have invented certain new and useful Improvements in Fastening Devices, of which the following is a specification.

This invention relates to fastening devices, and its object is the production of a fastening device for boxes and the like of very simple construction, having members which can be secured in place without the use of screws, nails and the like, and which can be engaged and disengaged by simply forcing them together or pulling them apart, without the use of any key or other disengaging instrument.

Figure 1 represents a front elevation of the members of the device engaged with each other, Fig. 2 shows a section of Fig. 1 on the line 2, 2, and the members of a receptacle to which the device is attached, Fig. 3 is an elevation of the male member of the device, Fig. 4 shows an end view of Fig. 3, Fig. 5 represents a bottom plan view of Fig. 3, Fig. 6 is an elevation of the female member of the device, Fig. 7 represents a side view of Fig. 6, and Fig. 8 is a bottom plan view of Fig. 6.

The invention comprises the male member 20 of a flat piece of material with its upper edge 21 practically formed to the curve of a circular arc. A plunger 22 with the curved edge 23 extends from the lower portion of said male member, and the shoulders 24 are formed at the sides of said plunger. In the body of the member 20 are struck up the triangular prongs 25 with their vertexes 26. The prongs are slightly deflected from the side of the body with which they are integral. The prongs are located so that their bases are toward the edge 21 of the said member 20.

The female member of the device comprises practically the annular portion 27 of a flat piece of material, and from the inner edge 28 thereof extend the spiral springs 29 which can be integral with the said female member, or secured thereto by any suitable means. Triangular prongs 30 extend from said female member and their vertexes 31 are slightly deflected from the opposite sides thereof.

The members of the device are secured in place in mortises or grooves in the elements 32 and 33, which they fasten or lock together.

The bodies of the members of the device can be slightly curved if desired to suit the swinging action of the members of a receptacle to which they are connected. The vertexes 26 and 31 of the prongs will engage the elements 32 and 33, and thereby prevent the members of the device becoming disengaged therefrom. When the members of the device are brought in engagement with each other the plunger 22 is engaged by the springs 29 which allows the said plunger to pass by them, and when sufficient effort is made to separate them the resilience of the springs will allow their separation.

Having described my invention I claim—

1. In a pair of fasteners the combination of a male member having an upper circular edge, a plunger extending from said member and having shoulders at the sides thereof, an annular female member, spiral springs extending from the inner edge of the latter member located to engage the shoulders of the male member when the members are forced together, and to disengage therefrom when a force is exerted to pull the members apart.

2. In a pair of fasteners the combination of a male member of a flat piece of material, a plunger extending from said member having shoulders on the sides thereof, a female member of a flat piece of material, spiral springs extending from the inner edge of the female member adapted to engage with the plunger of the male member when the said members are forced together, and said springs adapted to be disengaged therefrom when a force is exerted to pull the members apart, and prongs extending from each member.

Signed at the borough of Manhattan in the county of New York and State of New York this 7th day of January A. D. 1907.

WALTER FAVREAU.

Witnesses:
JOHN J. MILLIN,
M. ZIMANSKY.